United States Patent [19]

Howell

[11] 4,288,833
[45] Sep. 8, 1981

[54] LIGHTNING ARRESTOR

[75] Inventor: Edward K. Howell, Simsbury, Conn.

[73] Assignee: General Electric Company, New York, N.Y.

[21] Appl. No.: 103,962

[22] Filed: Dec. 17, 1979

[51] Int. Cl.³ .............................................. H02H 9/04
[52] U.S. Cl. .................................. 361/124; 361/105;
361/56; 338/21; 337/16; 337/28
[58] Field of Search ................. 361/124, 56, 105, 103,
361/106, 126, 127, 131, 117, 118, 119; 338/21,
20; 337/15, 16, 20, 28, 33, 34, 83, 108, 125

[56] References Cited

U.S. PATENT DOCUMENTS

| 2,839,635 | 6/1958 | Hasselhorn | 337/16 |
| 3,805,022 | 4/1974 | Kulwicki et al. | 338/21 X |
| 3,889,222 | 6/1975 | Takano et al. | 338/21 X |
| 4,015,228 | 3/1977 | Eda et al. | 337/28 |
| 4,068,277 | 1/1978 | Simokat | 361/105 X |
| 4,168,514 | 9/1979 | Howell | 361/106 X |

Primary Examiner—Patrick R. Salce
Attorney, Agent, or Firm—Robert A. Cahill; Walter C. Bernkopf; Philip L. Schlamp

[57] ABSTRACT

A metal oxide varistor (MOV) is directly electrically connected between a line conductor and ground to dissipate the energy associated with voltage surges appearing on the line conductor. A thermostatic switch, in the form of a resilient arm held in electrical connection with one of the MOV electrodes by low melting point solder, opens in response to a failing MOV to insert a spark gap electrically in series with the MOV. Overvoltage protection is thus maintained, albeit limited to higher level voltage surges.

13 Claims, 6 Drawing Figures

LIGHTNING ARRESTOR

BACKGROUND OF THE INVENTION

Currently available lightning arrestors for installation in residential circuits typically utilize a voltage-dependent resistor, such as a silicon carbide varistor, in series with a spark gap. The presence of the spark gap is prescribed since currently available silicon carbide varistors suitable for lightning arrestor application, being connected from line to neutral in a service entry panelboard, would otherwise draw excessive current at normal line voltage and thus heat up to the point of ultimately destroying itself. Failure of this silicon carbide varistor could then constitute a short circuit with damaging consequences. Since the spark gap has a typical breakdown voltage of 2,000 volts, the arrestor affords no overvoltage protection for voltage surges below this level. While such low level voltage surges do not pose significant harm to wiring and most connected loads, they are potentially damaging to electronic circuitry, particularly solid state electronic circuitry currently utilized in televisions, radios and audio equipment.

My U.S. Pat. No. 4,168,514 discloses a combination circuit breaker-lightning arrestor which utilizes a metal oxide varistor (MOV) directly electrically connected, i.e., no spark gap, from ground to a line connector at a point downstream from the breaker contacts and thermal trip element (bimetal). A suitable MOV for 120 volt circuit application should have a nominal rating of 220 volts at one milliampere and be capable of dissipating at least 20 joules and preferably 40 joules or more of electrical energy. Under these circumstances the MOV is capable of affording complete overvoltage protection against even relatively low level voltage surges. As a failsafe measure, the MOV is thermally coupled with the breaker trip element, such that, should the MOV go into a failure mode evidenced by the conduction of excessive leakage current under normal line voltage conditions, the consequent heat developed by the MOV ulitimately effects thermal tripping of the circuit breaker. The breaker contacts thus open to interrupt the flow of excessive MOV leakage current before the MOV goes to complete failure. At this point, the combination circuit breaker-lightning arrestor should be replaced, since, although a failing MOV can still afford voltage surge suppression, the closure of the circuit breaker would obviously result in reheating of the MOV and again thermal tripping of the circuit breaker. Repeated reclosures of the circuit breaker accelerates the MOV to complete failure with potentially hazardous consequences.

It is accordingly an object of the present invention to provide an improved lightning arrestor.

Another object is to provide a lightning arrestor of the above character which is normally capable of suppressing low level voltage surges potentially damaging to solid state electronic circuitry.

A further object is to provide a lightning arrestor of the above character which utilizes the voltage surge suppression potential of a failing voltage-dependent resistor to maintain overvoltage protection, albeit limited to higher level voltage surges.

Yet another object is to provide a lightning arrestor of the above character which automatically in response to a failing voltage-dependent resistor converts from a low level voltage surge suppressor to a higher level voltage surge suppressor.

A still further object is to provide a lightning arrestor of the above character which is simple in construction, inexpensive to manufacture and reliable in operation.

Other objects of the invention will in part be obvious and in part appear hereinafter.

SUMMARY OF THE INVENTION

In accordance with the present invention, there is provided a lightning arrestor comprising a voltage-dependent resistor, preferably a metal oxide varistor (MOV), and a series, normally closed thermostatic switch for electrical connection between a line conductor and ground such as to shunt to ground the currents associated with voltage surges appearing on the line conductor. Under normal line voltage conditions, the varistor safely draws very little leakage current. If for some reason the varistor starts to fail, typically because of having been called upon the shunt excessively large lightning-induced currents to ground, it will begin drawing excessive leakage current. The varistor is thermally coupled with the thermostatic switch such that the heat developed by the varistor in response to the excessive leakage current flowing therethrough causes the thermostatic switch to open. With the opening of this thermostatic switch, a spark gap of a predetemined dimension is inserted in series with the varistor. The spark gap is effective in preventing the flow of excessive leakage current, thus abating the progression of the failing varistor to complete failure which would otherwise ensue at an accelerated pace if the flow of excessive leakage current was permitted to continue. Despite its failing condition, the varistor is nevertheless capable of dissipating the energy associated with voltage surges of a level sufficient to break down the spark gap and to limit follow-through current in order that the spark gap can de-ionize when a voltage surge has subsided. Thus, while overvoltage protection for low voltage surges is lost, the lightning arrestor of the present invention continues to provide overvoltage protection for the potentially more damaging higher level voltage surges.

In accordance with one embodiment of the present invention, the spark gap is constituted by the switch gap created by the thermostatic switch itself in assuming its open position. In an alternative embodiment, one or more pre-existing spark gaps are normally shunted by the thermostatic switch in its closed position. Thus, when the switch opens, the spark gaps are inserted in series with the varistor.

The invention accordingly comprises the features of construction, combinations of elements and arrangements of parts which will be exemplified in the constructions hereinafter set forth, and the scope of the invention will be indicated in the claims.

For a fuller understanding of the nature and objects of the present invention, reference should be had to the following detailed description taken in conjunction with the accompanying drawing, in which.

Like reference numerals refer to corresponding parts throughout the several views of the drawing.

DETAILED DESCRIPTION

Figure 1:
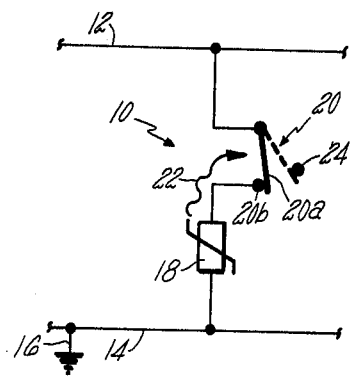
FIG. 1 is a circuit schematic diagram of lightning arrestor constructed in accordance with one embodiment of the present invention.

Referring to FIG. 1 of the drawing, a lightning arrestor constructed according to one embodiment of the invention and generally indicated at 10, is shown schematically being connected between a line conductor 12 and a neutral or ground conductor 14 solidly connected to ground as indicated at 16. Lightning arrestor 10 including a voltage dependent resistor 18, preferably in the form of a metal oxide varistor (MOV). I have determined that a suitable varistor for application in the present invention should have, for a typical 120 volt circuit application, a nominal rating of 220 volts at one milliampere, and be capable of dissipating at least 20 joules and preferably 40 joules or more of electrical energy. The lower end of the varistor 18 is electrically connected to grounded conductor 14, while the upper end is electrically connected through a normally closed thermostatic switch 20 to a line conductor 12. As indicated by arrow 22, the thermostatic switch is thermally coupled with the varistor.

It is seen from the circuit schematic of FIG. 1 that, with thermostatic switch 20 in its solid line, closed position, varistor 18 is directly connected between conductors 12 and 14. Under these circumstances, the varistor is rendered capable of shunting to ground the currents associated with rather low level voltage surges appearing on line conductor 12. In the absence of voltage surges on the line conductor, varistor 18 will safely draw very little leakage current under normal line voltage conditions, e.g., less than one milliamp. If the varistor begins drawing excessive leakage current, evidencing an insipient failure, the body of the varistor begins heating up, and this heat is coupled to thermostatic switch 20. In time, the thermostatic switch will be actuated to its open circuit position, seen in phantom line in FIG. 1, effective to interrupt this flow of excessive leakage current. Thus, the progression of the failing varistor to complete failure, which would otherwise ensue at an accelerated pace if the flow of excessive leakage current were permitted to continue, is halted. Physically associated with thermostatic switch 20 is a stop 24 which establishes the open circuit position of the movable arm 20a of the switch. There is thus established between the movable arm and the stationary switch contact 20b a switch gap which serves as a spark gap inserted in series with the failing varistor 18 coincidentally with the opening of the thermostatic switch. It is thus seen that the lightning arrestor 10 is now converted to a configuration typical of the lightning arrestors currently available, specifically, a varistor in series with a spark gap. Under these circumstances, the failing varistor is nevertheless capable of dissipating the energy associated with voltage surges of a level sufficient to break down this spark gap and to limit follow-through current, thereby enabling de-ionization of the spark gap as each voltage surge subsides. Overvoltage protection is thus maintained, despite the failing condition of varistor 18, although limited to voltage surges of a higher level. By way of example, stop 24 may be positioned such as to create a 12 mil switch gap which will break down in the face of voltage surges appearing on line conductor 10 on the order of 2000 volts. Once this spark gap breaks down, the failing varistor 18 operates to safely shunt current to ground.

Figure 2:
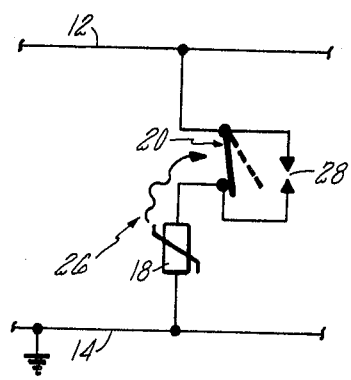
FIG. 2 is a circuit schematic diagram of a lightning arrestor constructed in accordance with an alternative embodiment of the present invention.

In the alternate embodiment of the invention schematically illustrated in FIG. 2, a lightning arrestor, generally indicated at 26, includes thermostatic switch 20 connected in series with varistor 18 and in shunt with a pre-existing spark gap 28. Thus, as long as the thermostatic switch remains in its normally closed position, varistor 18 is directly electrically connected between the line and neutral conductors with spark gap 28 effectively removed from this series circuit. However, when the thermostatic switch 20 opens in response to heat generated by a failing varistor, spark gap 28 is automatically electrically inserted in series with varistor 18 between the line and neutral conductors, thus leaving the lightning arrestor in service to at least afford suppression for voltage surges on line conductor 12 exceeding the breakdown voltage of spark gap 28.

Figure 3:
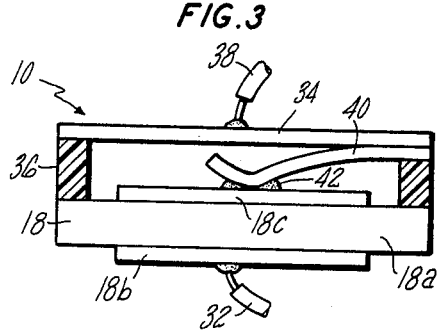
FIG. 3 is a side elevational view of a lightning arrestor constructed in accordance with the embodiment of the invention schematically illustrated in FIG. 1.
Figure 4:
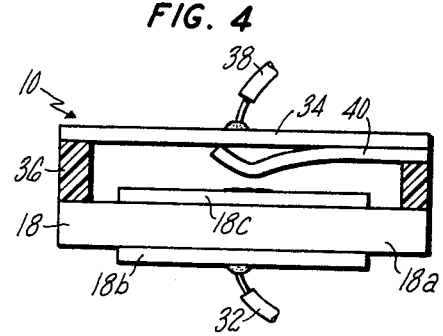
FIG. 4 is a side elevational view of the lightning arrestor of FIG. 3 seen with the thermostatic switch thereof in its open circuit position.

FIGS. 3 and 4 depict a representative structural execution of the lightning arrestor 10 of FIG. 1. Thus, varistor 18 consists of a disc of varistor material 18a sandwiched between plate-like electrodes 18b and 18c. To facilitate electrical connection of varistor 18 to neutral or ground conductor 14 of FIG. 1, a lead 32 is electrically connected by suitable means to electrode 18b. A conductive plate 34 is supported in spaced relation to the other varistor electrode 18c by an insulative ring 36 carried by varistor disc 18a. A lead 38 electrically connected by suitable means to disc 34 facilitates electrical connection of lightning arrestor 10 to line conductor 12 of FIG. 1. To provide thermostatic switch 20, a resilient switch arm 40 is supported in cantilever fashion by insulative ring 36 in electrical connection with disc 34. The free end of this arm is deflected downwardly into electrical engagement with electrode 18c, and electrical connection therebetween is preserved by low melting point solder, as indicated at 42.

From the description thus far, it is seen that when leads 32 and 38 are electrically connected to the neutral and line conductors, respectively, varistor 18 is directly electrically connected thereacross so long as the electrical connection between resilient arm 40 and varistor electrode 18c is maintained. If the varistor starts heating up due to the flow of excessive leakage current, eventually solder 42 melts, releasing arm 40 to spring upwardly into engagement with disc 34, as seen in FIG. 4, which then serves as stop 24 seen in FIG. 1. The crooked configuration of the free end portion of arm 40 is established such that when its tip engages disc 34, there is established a gap between the arm and electrode 18c sufficient to interrupt the flow of excessive leakage current through the varistor. Moreover, this switch gap is established at a width to create an effective spark gap in series with the varistor between the line and neutral conductors. If this spark gap is established at a width of approximately 12 mils, it will break down when subjected to voltage surges on line conductor 12 in excess of, for example, 2000 volts. Under these circumstances, varistor 18, despite its failing condition, is effective in dissipating the energy associated with these larger voltage surges.

Figure 5:
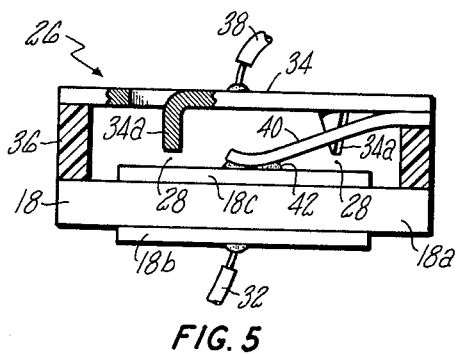
FIG. 5 is a side elevational view, partially broken away, of a lightning arrestor constructed in accordance with the embodiment of the invention schematically illustrated in FIG. 2.
Figure 6:
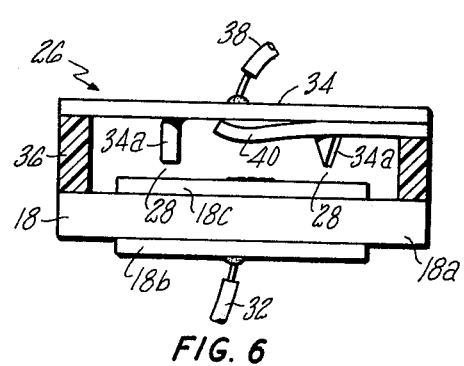
FIG. 6 is a side elevational view of the lightning arrestor of FIG. 5 seen with the thermostatic switch thereof in its open circuit position.

Turning to FIGS. 5 and 6, there is shown a representative structural execution of the lightning arrestor 26 of FIG. 2. In this alternative embodiment, conductive disc 34 is lanced to provide a plurality of downwardly turned prongs 34a which terminate in closely spaced relation to varistor electrode 18c, thereby establishing a plurality of pre-existing spark gaps 28. So long as arm 40 is held in direct electrical connection with varistor electrode 18c by the low melting point solder 42, these spark gaps are shunted from the circuit directly electrically connecting the varistor between the line and neutral conductors. Should the varistor begin to fail and thus draw excessive leakage current, the resulting heat generated by the varistor melts solder 42. Arm 40 is thus released to spring upwardly and thereby break the direct electrical connection of the varistor to the line conductor and coincidentally insert spark gaps 28 in series with the varistor. Consequently, the flow of excessive leakage current is halted, leaving the failing varistor in service to absorb the energy associated with voltage surges on the line conductor of sufficient magnitude to break down at least one of these spark gaps.

It will be apparent to those skilled in the art that a thermostatic switch operable in my invention may take a variety of forms, and thus the term as used herein should be interpreted in a generic sense. That is, the teachings of may invention are deemed to include any thermally responsive leakage current interrupting means operating in response to heat developed by a failing varistor to convert the direct electrical connection of the varistor into an overvoltage protectecd circuit to one including a series spark gap.

It will thus be seen that the objects set forth above, among those made apparent in the preceding description are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A lightning arrestor comprising, in combination:
   A. a voltage-dependent resistor having terminals for electrical connection between a line conductor of a power distribution circuit and ground;
   B. normally closed thermostatic switch means electrically connected in series with said resistor, said switch means being thermally coupled with said resistor such that heat generated by said resistor in response to excessive leakage current flowing therethrough under normal line voltage conditions causes said switch means to open and thereby interrupt the flow of said excessive leakage current; and
   C. a spark gap electrically connected in series with said resistor by the opening of said switch means, said spark gap preventing the flow of said excessive leakage current through said resistor and having a predetermined breakdown voltage such as to provide effective distribution circuit overvoltage protection, said resistor acting to dissipate the energy associated with line voltage surges in excess of said breakdown voltage and to insure deionization of said spark gap as each line voltage surge subsides.

2. The lightning arrestor defined in claim 1, wherein said voltage-dependent resistor is a metal oxide varistor.

3. The lightning arrestor defined in claims 1 or 2, wherein the width of said spark gap is on the order of 12 mils.

4. The lightning arrestor defined in claim 1, wherein said thermostatic switch includes a conductive spring arm deflected from an open circuit position to a closed circuit position sustained by low melting point solder thermally coupled with said voltage-dependent resistor, said arm being released to spring to its open circuit position when said solder is sufficiently melted by the heat developed in said resistor.

5. The lightning arrestor defined in claim 4, wherein said conductor spring arm is held in direct electrical connection with an electrode of said resistor by said solder.

6. The lightning arrestor defined in claim 5, wherein said spark gap is constituted by the switch gap established between said electrode and said arm in its open circuit position.

7. The lightning arrestor defined in claims 4, 5 or 6, wherein said voltage-dependent resistor is a metal oxide resistor.

8. The lightning arrestor defined in claim 1, wherein said thermostatic switch is electrically connected in shunt with said spark gap.

9. Lightning arrestor defined in claim 8, wherein said thermostatic switch includes a conductive spring arm deflected from an open circuit position to a closed circuit position sustained by low melting point solder thermally coupled with said voltage-dependent resistor, said arm being released to spring to its open circuit position when said solder is sufficiently melted by the heat developed in said resistor.

10. The lightning arrestor defined in claim 9, wherein said conductive spring arm is held in direct electrical connection with an electrode of said resistor by said solder.

11. The lightning arrestor defined in claim 10, wherein said spark gap is constituted by a conductive element directly electrically connected with said arm and supported in closely spaced relation to said electrode.

12. The lightning arrestor defined in claim 11, and further including a plurality of said conductive elements commonly, directly electrically connected with said arm and commonly supported in closely spaced relation to said electrode such as to provide a plurality of said spark gaps.

13. The lightning arrestor defined in claims 8, 9, 10, 11 or 12, wherein said voltage-dependent resistor is a metal oxide varistor.

* * * * *